United States Patent
Yehuda et al.

(10) Patent No.: US 9,529,615 B2
(45) Date of Patent: Dec. 27, 2016

(54) VIRTUAL DEVICE EMULATION VIA HYPERVISOR SHARED MEMORY

(75) Inventors: Shmuel Ben Yehuda, Haifa (IL); Eran Borovik, Zichron Yaakov (IL); Michael E. Factor, Haifa (IL); Zorik Machulsky, Gesher HaZiv (IL); Kalman Zvi Meth, Netanya (IL); Avishay Traeger, Jerusalem (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 12/953,483

(22) Filed: Nov. 24, 2010

(65) Prior Publication Data

US 2012/0131575 A1    May 24, 2012

(51) Int. Cl.
*G06F 9/455* (2006.01)
(52) U.S. Cl.
CPC . *G06F 9/45558* (2013.01); *G06F 2009/45579* (2013.01)
(58) Field of Classification Search
CPC .................. G06F 9/45558; G06F 2009/45579
See application file for complete search history.

(56) References Cited

U.S. PATENT DOCUMENTS

| | | | |
|---|---|---|---|
| 6,453,277 B1 | 9/2002 | Helsley et al. | |
| 6,496,847 B1 * | 12/2002 | Bugnion | G06F 9/45533 703/21 |
| 6,961,806 B1 * | 11/2005 | Agesen | G06F 9/45537 711/148 |
| 7,546,599 B2 * | 6/2009 | Nesher et al. | 718/1 |
| 7,558,723 B2 | 7/2009 | Traut | |
| 7,613,847 B2 | 11/2009 | Kjos et al. | |
| 7,689,987 B2 * | 3/2010 | Neil | G06F 9/4555 703/24 |
| 7,743,389 B2 | 6/2010 | Mahalingam et al. | |

(Continued)

FOREIGN PATENT DOCUMENTS

JP       2009259108       5/2009

OTHER PUBLICATIONS

Yaozu Dong et al., "Towards high-quality I/O virtualization", SYSTOR'09, May 4-6 2009, Haifa, Israel. URL: http://portal.acm.org/citation.cfm?id=1534547.

(Continued)

*Primary Examiner* — Benjamin Wu (57) ABSTRACT

Systems and methods for optimizing operation of a physical device in a virtualized computing environment are provided. The method comprises monitoring instructions issued by an application running on a virtual machine's (VM) operating system, wherein the VM is hosted by a hypervisor providing access to a physical device connected to a virtualized computing environment; wherein a device driver supported by the operating system issues one or more instructions to an emulated device supported by the hypervisor to control the physical device according to the issued instructions, wherein the emulated device's registers are implemented in memory of the hypervisor and the instructions issued by the device driver are stored in said registers, wherein the hypervisor handles the instructions, in response to learning that the instructions are stored in said registers.

18 Claims, 6 Drawing Sheets

(56) References Cited

U.S. PATENT DOCUMENTS

| | | | |
|---|---|---|---|
| 7,853,960 B1* | 12/2010 | Agesen et al. | 719/324 |
| 7,865,893 B1* | 1/2011 | Omelyanchuk | G06F 11/3644 710/1 |
| 8,286,174 B1* | 10/2012 | Schmidt | G06F 9/5077 709/226 |
| 2002/0143842 A1* | 10/2002 | Cota-Robles | G06F 9/45558 718/1 |
| 2004/0210911 A1* | 10/2004 | Bodin | G06F 9/4411 719/321 |
| 2005/0204357 A1* | 9/2005 | Garg | G06F 9/4426 718/1 |
| 2006/0136934 A1* | 6/2006 | Nesher et al. | 719/324 |
| 2006/0200820 A1* | 9/2006 | Cherkasova | G06F 11/3423 718/1 |
| 2006/0248528 A1* | 11/2006 | Oney | G06F 9/45533 718/1 |
| 2006/0294519 A1* | 12/2006 | Hattori | G06F 9/45558 718/1 |
| 2007/0288228 A1* | 12/2007 | Taillefer | G06F 9/45537 703/28 |
| 2008/0005297 A1* | 1/2008 | Kjos | G06F 12/1081 709/223 |
| 2008/0104589 A1 | 5/2008 | McCrory et al. | |
| 2008/0244105 A1* | 10/2008 | Rothman | G06F 1/3215 710/13 |
| 2008/0276258 A1* | 11/2008 | Liu | G06F 9/45537 719/327 |
| 2009/0077564 A1* | 3/2009 | Loeser | G06F 9/462 718/108 |
| 2009/0089815 A1* | 4/2009 | Manczak | G06F 9/45533 719/327 |
| 2009/0106754 A1* | 4/2009 | Liu | G06F 9/4812 718/1 |
| 2009/0119087 A1 | 5/2009 | Ang et al. | |
| 2009/0119684 A1* | 5/2009 | Mahalingam | G06F 9/45558 719/324 |
| 2009/0164990 A1* | 6/2009 | Ben-Yehuda | G06F 9/545 718/1 |
| 2009/0282101 A1* | 11/2009 | Lim | G06F 9/5077 709/203 |
| 2010/0204976 A1* | 8/2010 | Amano | G06F 11/261 703/25 |
| 2010/0223611 A1* | 9/2010 | Mahalingam | G06F 9/45537 718/1 |
| 2010/0280817 A1* | 11/2010 | Unseld | G06F 11/3696 703/21 |
| 2011/0161955 A1* | 6/2011 | Woller et al. | 718/1 |
| 2011/0246171 A1* | 10/2011 | Cleeton | G06F 9/45558 703/25 |
| 2011/0276779 A1* | 11/2011 | Engebretsen | G06F 13/4022 711/209 |
| 2012/0017030 A1* | 1/2012 | Borovik | G06F 12/0802 711/6 |

OTHER PUBLICATIONS

Jose Renato Santos et al., "Bridging the Gap between Software and Hardware Techniques for I/O Virtualization", HP Laboratories. To be published and presented at 2008 Usenix Annual Technical Conference, Jun. 22-27, 2008, Boston, Massachusetts. URL: http://www.hpl.hp.com/techreports/2008/HPL-2008-39.pdf.

* cited by examiner

VIRTUAL DEVICE EMULATION VIA HYPERVISOR SHARED MEMORY

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to virtual machines and, more particularly, to a system and method for optimizing data operations for a device emulated in a virtualized environment.

BACKGROUND

A virtual machine (VM) is a software implementation of a machine (i.e., a computer) that executes programs like a physical machine would. Generally, access to resources in virtualized environments is associated with a high level of overhead because the VM typically cannot directly communicate with a virtualized resource. A hypervisor that hosts the VM generally has the burden of emulating the needed interface or driver on behalf of the VM. In other words, the hypervisor presents the VM with a virtual platform and monitors the execution of the VM and how the VM accesses the available hardware resources and devices.

For example, for a VM to read or write data to a virtualized storage device, control of the read or write operations will have to be transferred between the VM and the hypervisor. In a purely emulated case, the VM has no knowledge that the emulated device is not a real physical device, because the hypervisor emulates the interface in software. A high overhead is associated with such emulation. The operational overhead is even more costly, if there is a need for transferring control intermittently between the VM and the hypervisor when accessing a device.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for optimizing operation of a physical device in a virtualized computing environment are provided. The method comprises monitoring instructions issued by an application running on a virtual machine's (VM) operating system, wherein the VM is hosted by a hypervisor providing access to a physical device connected to a virtualized computing environment; wherein a device driver supported by the operating system issues one or more instructions to an emulated device supported by the hypervisor to control the physical device according to the issued instructions, wherein the emulated device's registers are implemented in memory of the hypervisor and the instructions issued by the device driver are stored in said registers, wherein the hypervisor handles the instructions, in response to learning that the instructions are stored in said registers.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
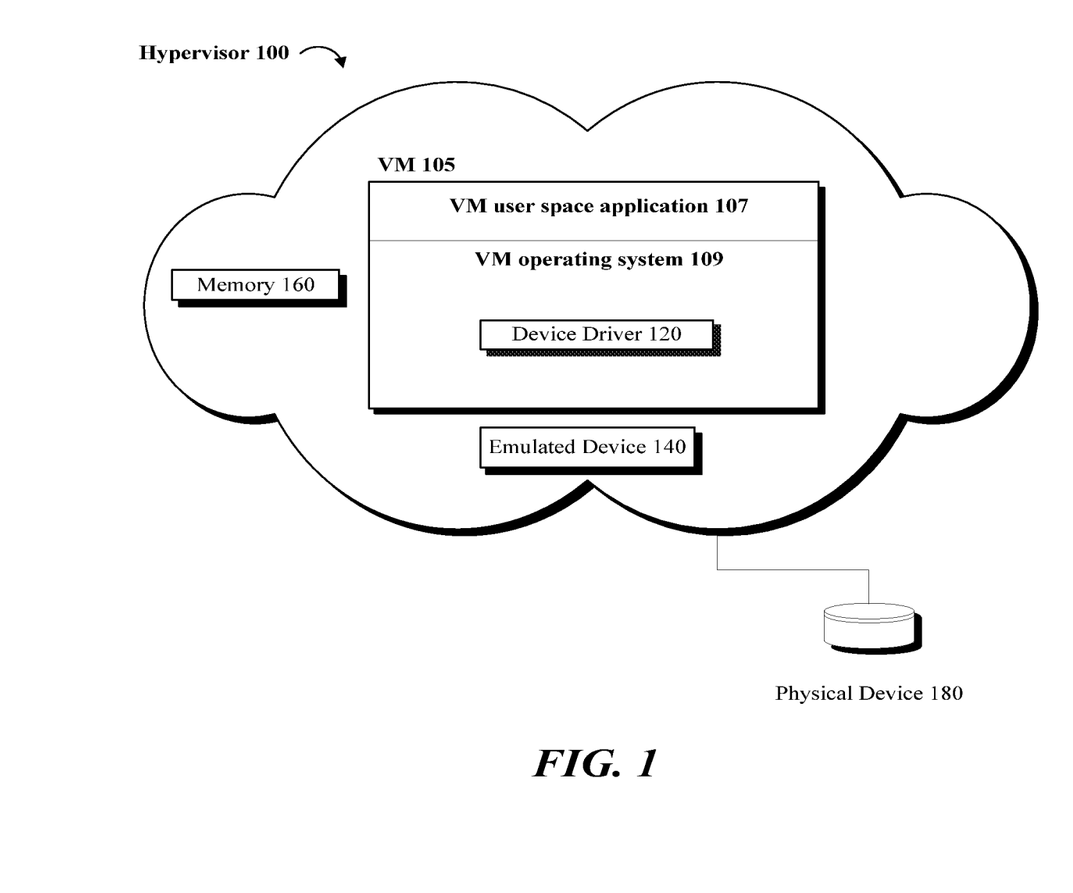
FIGS. 1 and 2 illustrate exemplary computing environments in accordance with one or more embodiments, wherein a VM hosted by a hypervisor is implemented to communicate with a device accessible via the hypervisor.

Referring to FIG. 1, in accordance with one embodiment, a VM 105 may be hosted by a hypervisor 100, in a computing environment. The hypervisor 100 may be implemented to support the emulation of a physical device (e.g., a disk storage device) to allow the VM 105 communicate with a resource (e.g., physical device 180). Emulated device 140 acts as an interface between the device driver 120 and physical device 180. For example, emulated device 140 may support a standard protocol for interfacing with device driver 120, where the protocol defines the manner of use of the device registers and the respective I/O functionality.

Emulated device 140 may be implemented in software or firmware to emulate some physical device so that a VM may communicate with the physical device 180 without any knowledge of the exact structure or nature of the particular interface requirements of physical device 180. Depending on implementation, the overhead associated with the emulation and the need for transfer of control between VM 105 and the hypervisor 100 may be reduced by way of using a para-virtualized device to act as an interface between the device driver 120 and physical device 180. In one embodiment, para-virtualization of a device may be accomplished by using a virtualized component (e.g., a custom driver) to enhance the system's performance by, for example, batching multiple instructions or I/O requests and using shared memory to avoid multiple data copies.

As shown in FIG. 1, a computer-implemented application such as a software code (e.g., user space application 107) may be running on a VM operating system 109 executed on VM 105. The VM operating system 109 may support a device driver 120 and the hypervisor 100 may support an emulated device 140 capable of communicating with the device driver 120 and physical device 180. A device assignment option may be utilized, in one implementation, to allow the VM 105 access physical device 180. A device assignment grants the VM 105, desirably, full access to physical device 180 so that the VM 105 may send I/O requests directly to physical device 180, where interrupts may be routed through the hypervisor 100. Device assignment option may not be desirable if physical device 180 is intended for sharing among several VMs and the hypervisor and does not support VM migration due to the VM's direct interface assignment to a particular device.

In one implementation, the emulated device 140 has registers that are virtually implemented in the hypervisor 105 memory 160. That is, a portion of hypervisor 105 memory 160 may be shared or reserved for the emulated device 140, wherein any instructions issued by the device driver 120 are written to said shared memory area. In this manner, the device driver 120 and the emulated device 140 may be configured to allow hypervisor 100 to monitor or control corresponding operations on physical device 180.

In one embodiment, an instruction written to the emulated device 140 registers (i.e., shared hypervisor 100 memory 160) may be controlled by the VM operating system 109, or monitored by the hypervisor 100 or the emulated device 140. It is noteworthy that the emulated device 160 registers may be fully accessible from the hypervisor 100 as the registers are implemented in the hypervisor 105 memory 160. In accordance with one embodiment, device driver 120 is unaware that it is communicating with emulated device 140 and not physical device 180 when issuing the respective instructions.

As provided in further detail below, the emulated device 140 or the hypervisor 100 may monitor the shared memory 160 to determine when an instruction is sent from device driver 120 to emulated device 140. Upon detecting such instruction, the hypervisor 100 is engaged to handle the instruction by emulating the proper behavior for the physical device 180. In this manner, the overall operational performance of the physical device 180 is improved as the number of control switches between the VM 105 and the hypervisor 100 is minimized. In one embodiment, the monitoring of the shared memory 160 takes place by way executing a separate thread of execution from the VM 105 to allow the emulated device 140 or the hypervisor 100 to determine if instructions are written to the memory 160, while the VM 105 continues to run.

As such, in the above exemplary scenario, when the device driver 120 writes to a device register implemented in shared memory 160, the VM 105 continues to run, while in a separate thread of execution, the emulated device 140 or the hypervisor 100 continues to monitor data written to the device registers in shared memory 160. In response to noticing a change in the register value (i.e., resulting from a write operation from the device driver 120) the emulated device 140 or the hypervisor 100 performs the task to handle the instruction without the VM 105 having to exit and explicitly notify the hypervisor of changes in the register value (i.e., cause a switch in CPU control from the VM to the hypervisor).

Figure 2:
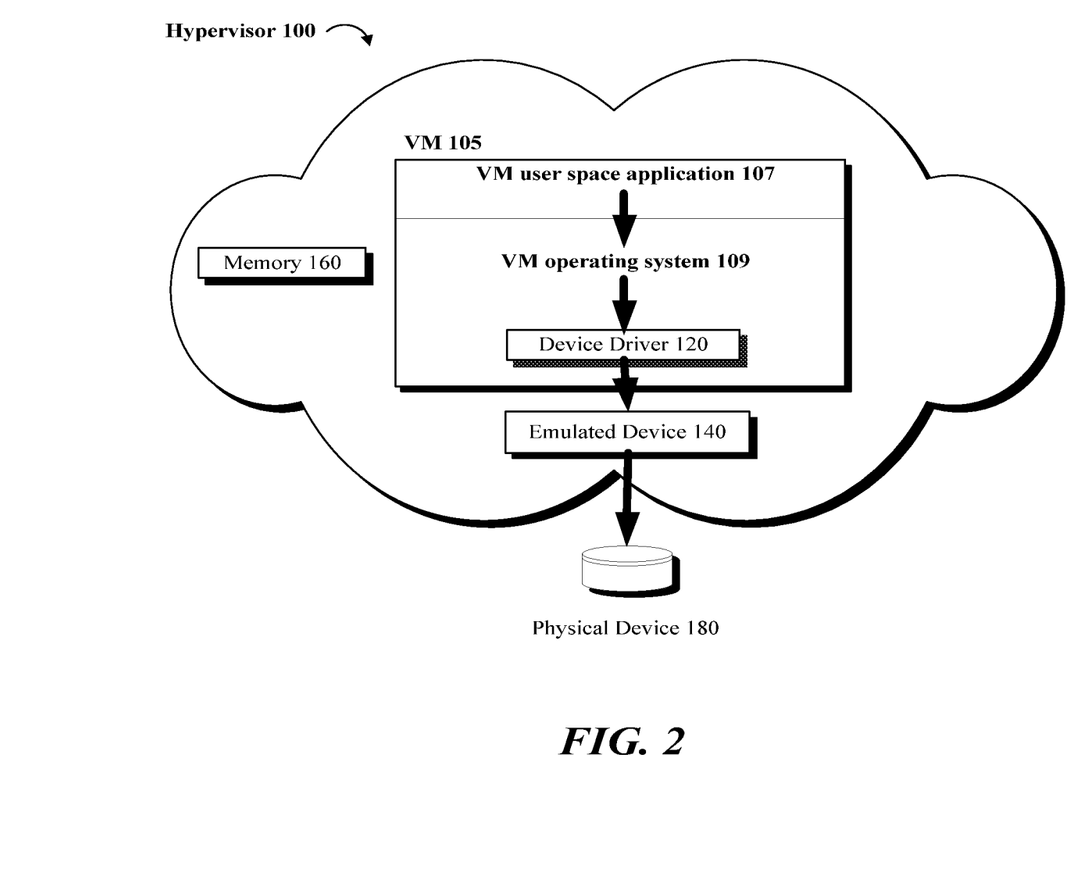
Figure 3A:
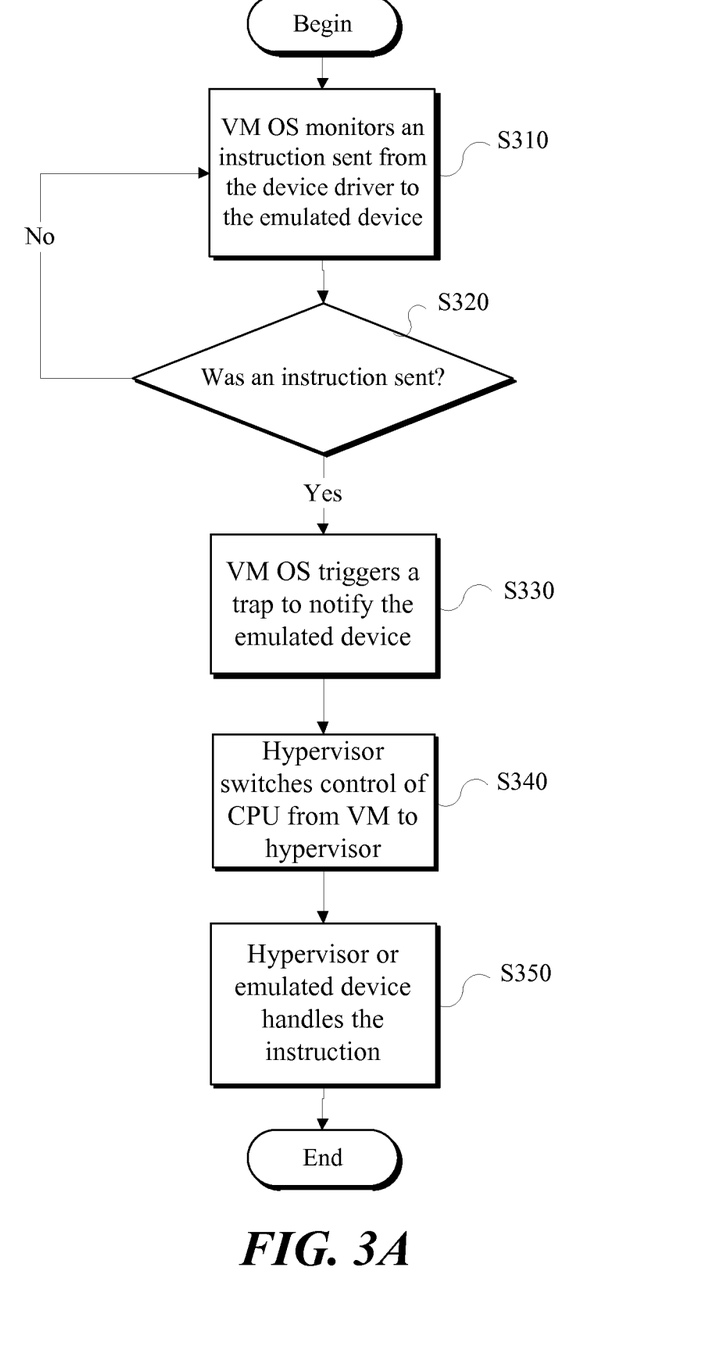
FIGS. 3A and 3B are exemplary flow diagrams of methods for handling instructions to control the device illustrated FIGS. 1 and 2 in accordance with one embodiment.

Referring to FIGS. 2 and 3A, in one embodiment, VM user space application 107 may issue a system call. The VM's operating system 109 monitors the system calls for input/output (I/O) operations or other issued instructions and determines whether an instruction was sent from the device driver 120 to emulated device 140 (S310). For example, the device driver 120 in VM 105 may send and instruction to the emulated device 140 using a programmed input/output (PIO) or a memory-mapped I/O (MMIO) method.

PIO and MMIO are methods of transferring data and performing I/O between a CPU and one or more physical devices 180 (e.g., network adapters, storage devices, etc.). For example, a PIO may happen when VM user space application 107 issues CPU instructions that access I/O address space to perform data transfers to or from physical device 180. MMIO may use an address interface (e.g., a bus) to address both memory 160 and physical device 180. The CPU instructions used to access memory 160 may be also used for accessing physical device 180.

In one embodiment, areas of the CPU's addressable space may be reserved for I/O. The reservation may be temporary or permanent, for example. Depending on implementation, physical device 180 may monitor the CPU's address bus and respond to the CPU's access of device-assigned address space, connecting the data bus to the physical device 180 hardware register.

In the virtualized system illustrated in FIG. 2, the VM operating system 109 may detect that a CPU instruction is issued from the device driver 120 to the emulated device 140 (S320). If so, the VM operating system 109 generates a signal (e.g., triggers a trap) to notify the emulated device 140 of the arrival of the instruction (S330).

It is noteworthy that since the VM user space application 107 is executed within the context of the VM 105, the VM 105 is responsible for handling the respective CPU instructions. In one embodiment, the hypervisor 100 causes control of the CPU to be switched from the VM 105 to the hypervisor 100 (S340), in response to the above-mentioned trap being triggered. As such, depending on implementation, the emulated device 140 or hypervisor 100 may directly handle the instruction (S350).

Figure 3B:
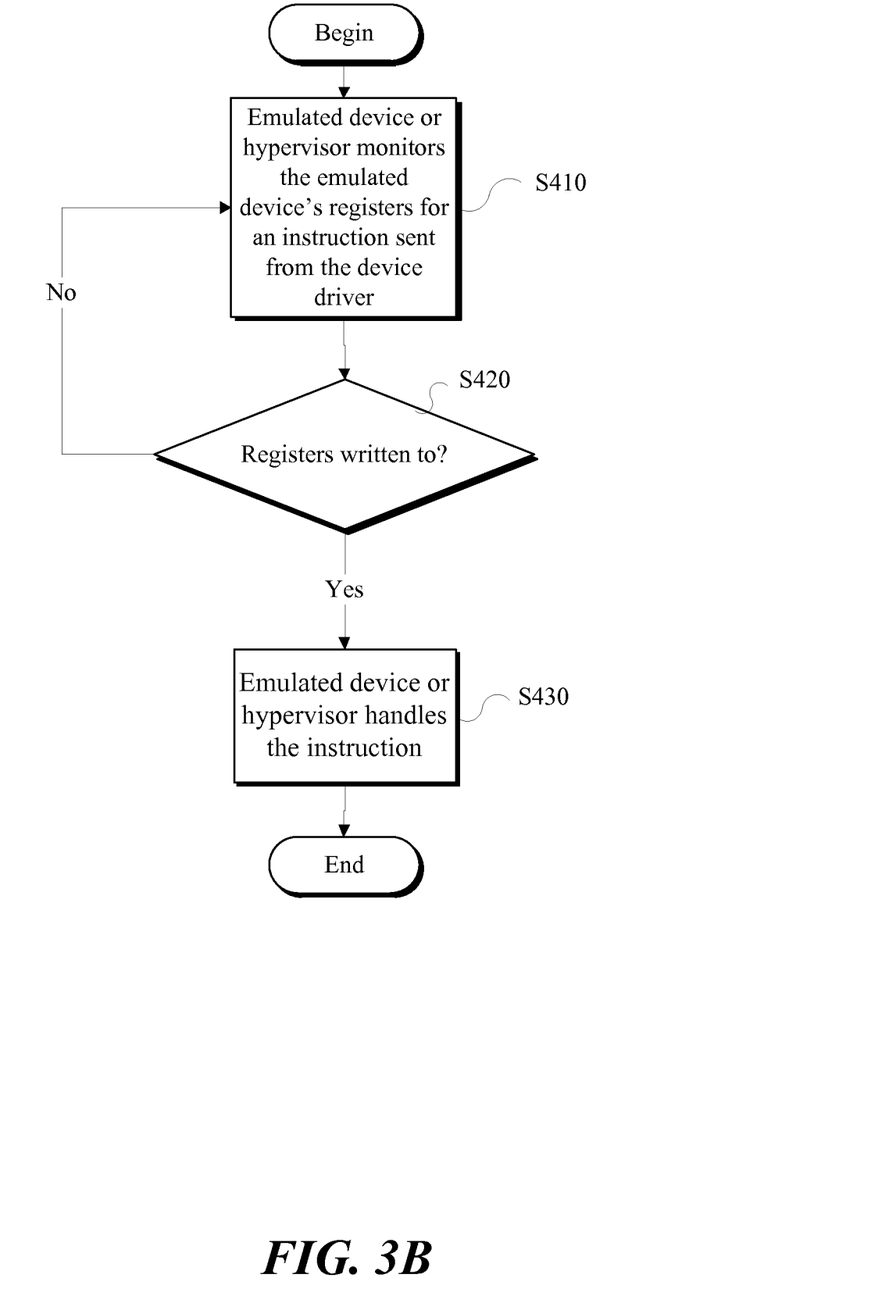

Referring to FIGS. 2 and 3B, in an alternative implementation, the emulated device 140 or hypervisor 100 actively monitors (e.g., polls) the emulated device 140 registers (i.e., areas of memory 160 shared with the hypervisor) for instructions issued by the device driver 120 for the emulated device 140 (S410). If the registers are written to (S420), then the emulated device 140 or hypervisor 100 handles the instruction (S430).

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
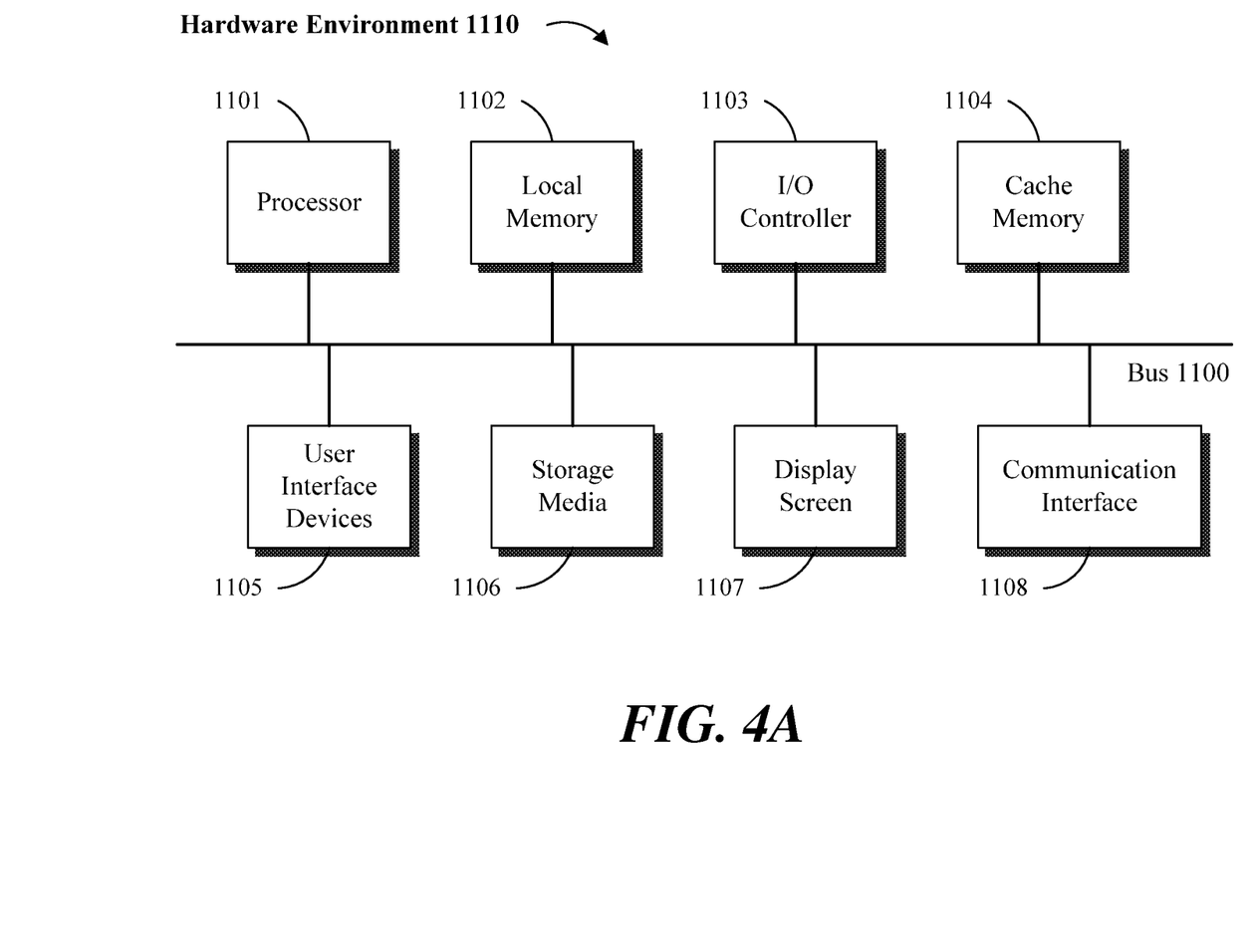
FIGS. 4A and 4B are block diagrams of hardware and software environments in which the disclosed systems and methods may operate, in accordance with one or more embodiments.
Figure 4B:
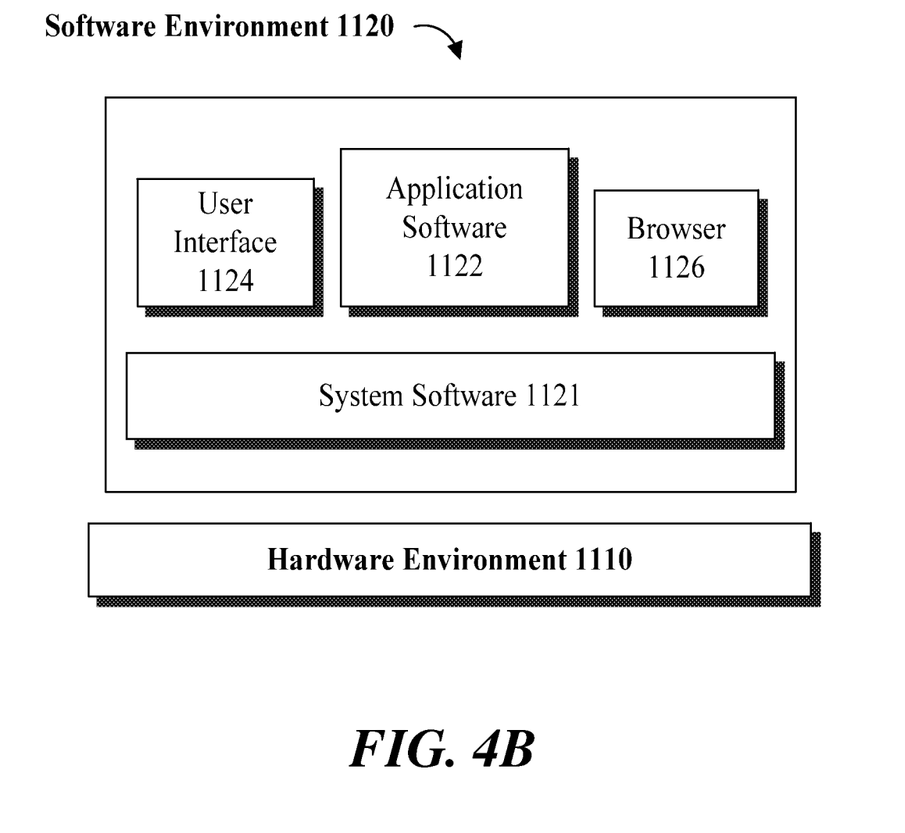

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data.

It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for optimizing operation of a physical device in a virtualized computing environment, comprising:
    executing a hypervisor hosting a virtual machine;
    running an application, via a first execution thread, on an operating system of the virtual machine;
    issuing, by a device driver supported by the operating system and responsive to instructions from the application, control instructions to an emulated device, wherein the hypervisor and the device driver have a shared memory area, the control instructions issued from the device driver are written to the shared memory area, and the emulated device is an interface between the device driver and the physical device;
    monitoring, by a second execution thread of the virtual machine, the shared memory to detect data written by the device driver, the second execution thread to update a register value based on the written data to prevent a switch in control of a central processing unit (CPU) from the virtual machine to the hypervisor;
    reserving areas of the CPU's addressable space for I/O operations; and
    monitoring, by the physical device, the CPU's address bus and responding to the CPU's access of device-assigned address space.

2. The method of claim 1, wherein
    the emulated device monitors the shared memory area for the issued control instructions.

3. The method of claim 1, wherein
    the hypervisor monitors the shared memory area for the issued control instructions.

4. The method of claim 1, wherein
    the device driver writes the control instructions to the shared memory area.

5. The method of claim 1, wherein
    the control instructions are written to a device register reserved for the emulated device within the shared memory area.

6. A computer-implemented method for optimizing operation of a physical device in a virtualized computing environment, comprising:
    executing a hypervisor hosting a virtual machine;
    running an application, via a first execution thread, on an operating system of the virtual machine;
    issuing, by a device driver supported by the operating system and responsive to instructions from the application, control instructions to device registers for an emulated device, wherein the emulated device is an interface between the device driver and the physical device;
    monitoring the device registers by a second execution thread of the virtual machine;
    handling, without causing a CPU control switch from the virtual machine to the hypervisor, the control instructions within the device registers;
    reserving areas of the CPU's addressable space for I/O operations; and
    monitoring, by the physical device, the CPU's address bus and responding to the CPU's access of device-assigned address space.

7. The method of claim 6, wherein
    the emulated device monitors the device registers for the issued control instructions.

8. The method of claim 6, wherein
    the device driver writes the control instructions to the device registers.

9. The method of claim 6, wherein
    the device register are reserved within a memory area shared between the hypervisor and the device driver.

10. A computer hardware system configured to optimize operation of a physical device in a virtualized computing environment, comprising:
    at least one processor, wherein the at least one processor is configured to perform:
        executing a hypervisor hosting a virtual machine;
        running an application, via a first execution thread, on an operating system of the virtual machine;
        issuing, by a device driver supported by the operating system and responsive to instructions from the application, control instructions to an emulated device, wherein the emulated device is an interface between the device driver and the physical device;
        monitoring, by a second execution thread of the virtual machine, a shared memory to detect data written by the device driver, the second execution thread to update a register value based on the written data to prevent a switch in control of a central processing unit (CPU) from the virtual machine to the hypervisor;
        reserving areas of the CPU's addressable space for I/O operations; and
        monitoring, by the physical device, the CPU's address bus and responding to the CPU's access of device-assigned address space.

11. The system of claim 10, wherein
    the emulated device monitors the shared memory area for the issued control instructions.

12. The system of claim 10, wherein
    the hypervisor monitors the shared memory area for the issued control instructions.

13. The system of claim 10, wherein
    the device driver writes the control instructions to the shared memory area.

14. The system of claim 10, wherein
    the control instructions are written to a device register reserved for the emulated device within the shared memory area.

15. A computer hardware system configured to optimize operation of a physical device in a virtualized computing environment, comprising:
    at least one processor, wherein the at least one processor is configured to perform:
    executing a hypervisor hosting a virtual machine;
    running an application, via a first execution thread, on an operating system of the virtual machine;
    issuing, by a device driver supported by the operating system and responsive to instructions from the application, control instructions to device registers for an emulated device, wherein the emulated device is an interface between the device driver and the physical device;
    monitoring the device registers via a second execution thread of the virtual machine;
    handling, without causing a CPU control switch from the virtual machine to the hypervisor, the control instructions within the device registers;
    reserving areas of the CPU's addressable space for I/O operations; and
    monitoring, by the physical device, the CPU's address bus and responding to the CPU's access of device-assigned address space.

16. The system of claim 15, wherein the emulated device monitors the device registers for the issued control instructions.

17. The system of claim 15, wherein the device driver writes the control instructions to the device registers.

18. The system of claim 15, wherein the device register are reserved within a memory area shared between the hypervisor and the device driver.

* * * * *